United States Patent
Frank

(10) Patent No.: US 11,102,730 B2
(45) Date of Patent: *Aug. 24, 2021

(54) METHOD AND APPARATUS FOR DETERMINING PER CARRIER ADDITIONAL MAXIMUM POWER REDUCTION FOR DUAL CARRIER OPERATION

(71) Applicant: Lenovo (Singapore) Pte. Ltd., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 90 days.

This patent is subject to a terminal disclaimer.

(21) Appl. No.: 16/537,538

(22) Filed: Aug. 10, 2019

(65) Prior Publication Data

US 2020/0053665 A1 Feb. 13, 2020

Related U.S. Application Data

(60) Provisional application No. 62/717,386, filed on Aug. 10, 2018.

(51) Int. Cl.
*H04W 52/34* (2009.01)
*H04L 5/00* (2006.01)
(Continued)

(52) U.S. Cl.
CPC ......... *H04W 52/346* (2013.01); *H04L 5/0007* (2013.01); *H04W 52/367* (2013.01);
(Continued)

(58) Field of Classification Search
CPC .............. H04L 5/0007; H04W 52/243; H04W 52/346; H04W 52/362; H04W 52/367;
(Continued)

(56) References Cited

U.S. PATENT DOCUMENTS

| | | | | |
|---|---|---|---|---|
| 10,869,284 B2* | 12/2020 | Frank | .................... | H04W 72/02 |
| 2012/0184327 A1* | 7/2012 | Love | .................... | H04W 52/267 |
| | | | | 455/552.1 |
| 2016/0345298 A1* | 11/2016 | Frank | .................... | H04W 72/04 |

FOREIGN PATENT DOCUMENTS

WO 2018057983 A1 3/2018

OTHER PUBLICATIONS

PCT International Search Report for PCT/IB2019/056821, Lenovo (Singapore) Pte. Ltd., dated Dec. 4, 2019.
(Continued)

*Primary Examiner* — Kashif Siddiqui
(74) *Attorney, Agent, or Firm* — Loppnow & Chapa

(57) ABSTRACT

A method and apparatus is provided for determining a per carrier additional maximum power reduction needed to meet emission requirements for dual carrier operation of adjacent carriers. A per carrier allowed additional maximum power reduction for a worst case allocation is determined for the dual carrier operation of the adjacent carriers of the different radio access technologies in absence of the shared scheduling information. The determination for each of the carriers for use with the different radio access technologies includes determining a total power reduction allowed for meeting emission requirements for each of one or more respective allocation ratios, and determining a fraction of a total power allocated to the carrier for each of one or more respective allocation ratios. Where for each of the one or more respective allocation ratios, a per carrier additional power reduction is determined as a sum of the total power reduction allowed for meeting emission requirements and a negative of ten times a base ten logarithm of the fraction of the total power allocated to the carrier. The per carrier additional power reduction of the one or more respective allocations are compared, and the per carrier additional power reduction of the one or more respective allocation ratios, which has a (Continued)

highest value, is selected as the worst case per carrier additional maximum power reduction for each of the associated one of the different radio access technologies.

17 Claims, 6 Drawing Sheets

(51) Int. Cl.
  *H04W 52/36* (2009.01)
  *H04W 72/04* (2009.01)
  *H04W 72/12* (2009.01)
  *H04W 88/06* (2009.01)
(52) U.S. Cl.
  CPC ......... *H04W 72/044* (2013.01); *H04W 72/12* (2013.01); *H04W 88/06* (2013.01)

(58) Field of Classification Search
  CPC ... H04W 52/38; H04W 72/044; H04W 72/12; H04W 88/06
  See application file for complete search history.

(56) References Cited

OTHER PUBLICATIONS

Motorola Mobility, "On AMPR for DC_(n)71B without Dynamic Power Sharing", R4-1811319, 3GPP TSG RAN WG4 #88, Gothenburg, Sweden, Aug. 20-25, 2018.
3GPP TS 38.101-3 V15.2.0 (Jun. 2018), 3rd Generation Partnership Project, Technical Specification Group Radio Access Network; NR; User Equipment (UE) radio transmission and reception; Part 3: Range 1 and Range 2 Interworking operation with other radios (Release 15).

* cited by examiner

METHOD AND APPARATUS FOR DETERMINING PER CARRIER ADDITIONAL MAXIMUM POWER REDUCTION FOR DUAL CARRIER OPERATION

FIELD OF THE INVENTION

The present disclosure is directed to a method and apparatus for determining per carrier additional maximum power reduction (A-MPR) including the per carrier additional maximum power reduction for use in contiguous dual carrier operation, such as in bands 71 and n71.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In order to support greater data throughputs, service providers have been increasingly looking at techniques which extend the available bandwidth that is allowed to be used by a particular user within the system. At least a couple of bandwidth extending techniques include the use of carrier aggregation and/or dual carrier, where multiple frequency bands are selected to operate together. For example, by utilizing more than one carrier through carrier aggregation it may be possible to increase the overall transmission bandwidth associated with a particular data channel and correspondingly enhance the data capacity of that channel. Additionally and/or alternatively, a dual or multiple carrier approach can allow two or more spectrum allocations to be paired and/or used in parallel, including spectrum allocations alternatively associated with different standards and/or radio access technologies, which can also be used to support the ability of enhanced and/or more robust data throughput.

Such a possibility might better support the beginning stages of adoption for a particular standard, where area coverage for the emerging standard at least initially may be less than complete. During such a period of transition, it may be beneficial to better support the transition to an emerging standard by allowing bearers for the new standard to be supported in conjunction with the infrastructure of the more mature or previously established standard, and/or to supplement coverage of the emerging standard with coexisting communications using the more established standard.

However, the coexistence of communications via multiple carriers can sometimes result in the mixing in the radio of the two separate sets of signals, whereby intermodulation products from transceiver non-linearity can cause spurious and/or unwanted signaling in unintended signal frequencies. There are limits to the amount of power a device can spill over into an unintended spectrum space, and depending upon how much information is shared between each of the at least two radio access technologies, it may be difficult to predict or control an amount of power produced as part of the resulting intermodulation products. Generally, one technique via which the power in an unintended area of the spectrum can be managed is through an attenuation of the signaling in one or both of the components, which together are contributing to the unwanted emissions. However, it may not always be clear how much attenuation is necessary in instances where the system that is tasked with deciding how much attenuation to apply to itself does not know the exact nature of the other signal associated with the other radio access technology that together is supporting the dual connectivity.

Previously, estimates as to a worst case have been assumed for the signaling of the other radio access technology, and an amount of power reduction is then determined as being necessary to insure avoidance of the unwanted emissions. However excessive power reductions in one or both of the carriers of the dual connectivity can negatively impact the communications associated with the particular carrier. The present inventor has recognized that past estimates have often been overly conservative, and in some instances may have assumed conditions that could not be possible, which in turn may have resulted in significant power reductions being enforced for one or both of the multiple dual connectivity carriers, and that there may be better estimates for a worst case estimate, which may allow the amount of enforced power reduction in a particular one of the multiple carriers contributing to the potential unwanted signaling to be reduced.

SUMMARY

The present application provides a method in a user equipment for determining a per carrier additional maximum power reduction needed by the user equipment in order to meet emission requirements for dual carrier operation of adjacent carriers in absence of shared scheduling information between the adjacent carriers, each carrier having an associated respective one of multiple different radio access technologies. The method includes determining a per carrier allowed additional maximum power reduction for a worst case allocation for the dual carrier operation of the adjacent carriers of the different radio access technologies in absence of the shared scheduling information. The determination for each of the carriers for use with the different radio access technologies includes determining a total power reduction allowed for meeting emission requirements for each of one or more respective allocation ratios, and determining a fraction of a total power allocated to the carrier for each of one or more respective allocation ratios. For each of the one or more respective allocation ratios, a per carrier additional power reduction is determined as a sum of the total power reduction allowed for meeting emission requirements and a negative of ten times a base ten logarithm of the fraction of the total power allocated to the carrier. The per carrier additional power reduction of the one or more respective allocations are compared, and the per carrier additional power reduction of the one or more respective allocation ratios, which has a highest value, is selected as the worst case per carrier additional maximum power reduction for each of the associated one of the different radio access technologies. The method further includes using the per carrier additional maximum power reduction corresponding to the worst case per carrier additional maximum power reduction in connection with transmissions when operating in a particular one of the dual carriers corresponding to the associated radio access technology.

According to another possible embodiment, a user equipment in a communication network is provided. The user equipment includes a controller that determines a per carrier allowed additional maximum power reduction for a worst case allocation for the dual carrier operation of adjacent carriers of different radio access technologies in absence of shared scheduling information between the adjacent carriers. The determination for each of the carriers for use with the different radio access technologies includes determining a total power reduction allowed for meeting emission requirements for each of one or more respective allocation ratios, and determining a fraction of a total power allocated to the carrier for each of one or more respective allocation ratios. For each of the one or more respective allocation ratios, a per carrier additional power reduction is determined as a sum of the total power reduction allowed for meeting emission requirements and a negative of ten times a base ten logarithm of the fraction of the total power allocated to the carrier. The per carrier additional power reduction of the one or more respective allocations are compared, and the per carrier additional power reduction of the one or more respective allocation ratios is selected, which has a highest value, as the worst case per carrier additional maximum power reduction for each of the associated one of the different radio access technologies. The user equipment further includes a transceiver that uses the per carrier additional maximum power reduction corresponding to the worst case per carrier additional maximum power reduction in connection with transmissions when operating in a particular one of the dual carriers corresponding to the associated radio access technology.

According to a further possible embodiment, a method in a network entity for a first radio access technology in a communication network for determining a per carrier additional maximum power reduction for a first radio access technology carrier of a dual carrier operation user equipment is provided, where the dual carriers are adjacent uplink carriers corresponding to different radio access technologies, and where the network entity does not have knowledge of the uplink allocation for a second radio access technology carrier associated with the dual carrier operation, which is different from the first radio access technology carrier. The method includes determining a per carrier allowed additional maximum power reduction for a worst case allocation for a first radio access technology carrier without knowledge of the uplink allocation for the second radio access technology carrier. The determination for the first radio access technology carrier includes determining a total power reduction allowed for meeting emission requirements for each of one or more respective allocation ratios, and determining a fraction of a total power allocated to the carrier for each of one or more respective allocation ratios. For each of the one or more respective allocation ratios, a per carrier additional power reduction is determined as a sum of the total power reduction allowed for meeting emission requirements and a negative of ten times a base ten logarithm of the fraction of the total power allocated to the carrier. The per carrier additional power reduction of the one or more respective allocations is compared, and the per carrier additional power reduction of the one or more respective allocation ratios, which has a highest value, is selected as the worst case per carrier additional maximum power reduction for the first radio access technology carrier. The method further includes using the per carrier additional maximum power reduction corresponding to the worst case per carrier additional maximum power reduction in connection with the assignment of an allocation and a modulation and coding scheme to the user equipment to be used when transmitting on the first radio access technology carrier.

According to a still further possible embodiment, a network entity for a first radio access technology in a communication network is provided. The network entity includes a controller that determines a per carrier allowed additional maximum power reduction for a worst case allocation for a first radio access technology carrier without knowledge of the uplink allocation for the second radio access technology carrier. The determination for the first radio access technology carrier includes determining a total power reduction allowed for meeting emission requirements for each of one or more respective allocation ratios, and determining a fraction of a total power allocated to the carrier for each of one or more respective allocation ratios. For each of the one or more respective allocation ratios, a per carrier additional power reduction is determined as a sum of the total power reduction allowed for meeting emission requirements and a negative of ten times a base ten logarithm of the fraction of the total power allocated to the carrier. The per carrier additional power reduction of the one or more respective allocations are compared, and the per carrier additional power reduction of the one or more respective allocation ratios, which has a highest value is selected, as the worst case per carrier additional maximum power reduction for the first radio access technology carrier. The network entity further includes a transceiver that uses the per carrier additional maximum power reduction corresponding to the worst case per carrier additional maximum power reduction in connection with the assignment of an allocation and a modulation and coding scheme to the user equipment to be used when transmitting on the first radio access technology carrier.

These and other features, and advantages of the present application are evident from the following description of one or more preferred embodiments, with reference to the accompanying drawings.

DETAILED DESCRIPTION OF THE PREFERRED EMBODIMENT(S)

Figure 1:
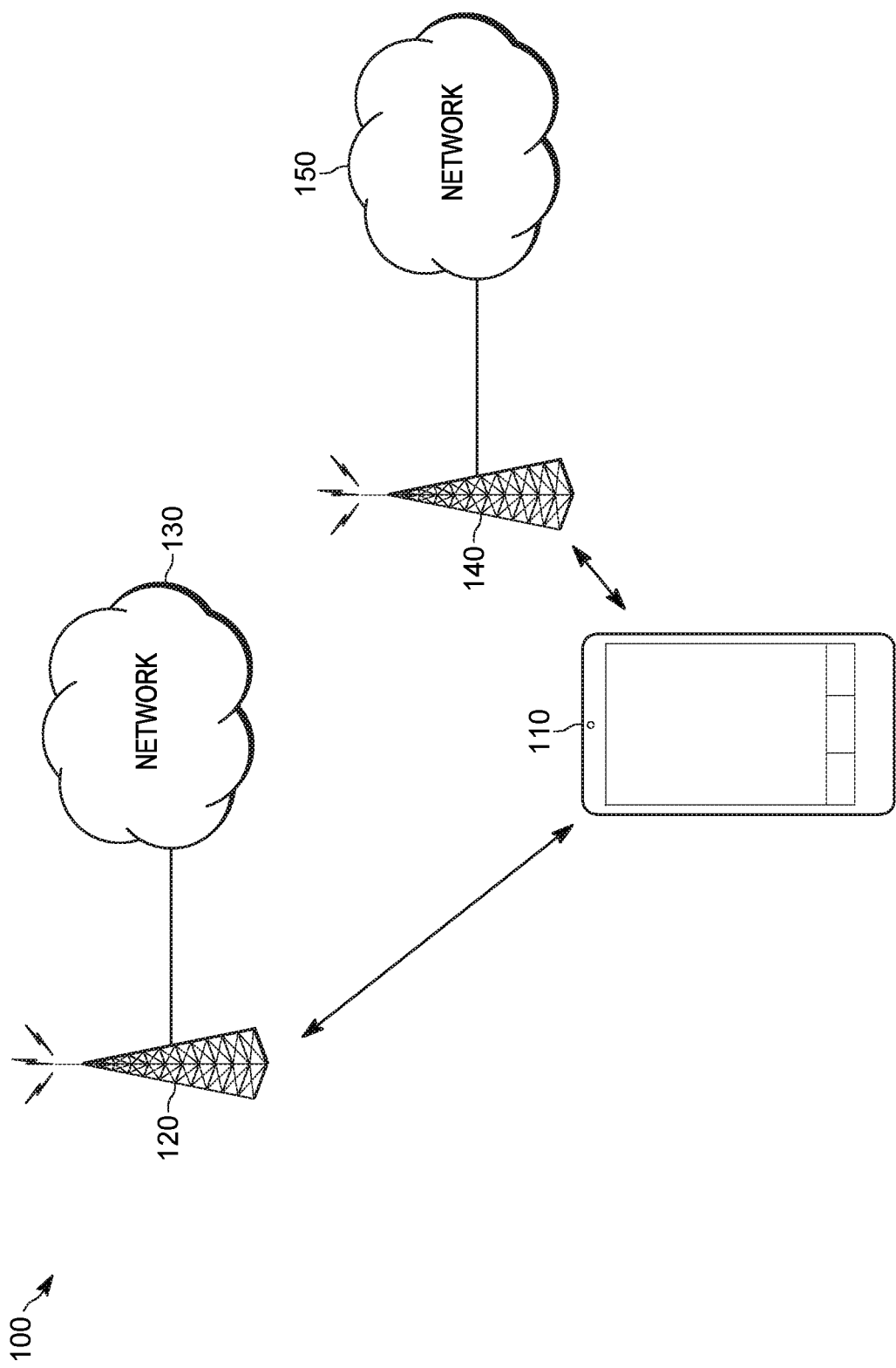
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus including a determination of per carrier additional maximum power reduction for dual carrier operation of adjacent carriers in absence of shared scheduling information between the adjacent carriers.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. In at least some instances, the system can include a second base station 140, which can be used to support access to a second network 150. In some instances, the second base station 140 and second network 150 can support communications using a different radio access technology.

The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The networks 130 and 150 can each include any type of network that is capable of sending and receiving wireless communication signals. For example, the networks 130 and/or 150, can each include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a new radio access technology (NR) network, a 5th generation (5G) network, a 3rd Generation Partnership Project (3GPP)-based network, a satellite communications network, a high altitude platform network, the Internet, and/or other communication networks. Each network will often have its own related supporting infrastructure. Access to both sets of network infrastructure can be used to support dual connectivity.

In some existing solutions, each radio access technology (RAT) scheduler may make two separate assumptions in computing the worst case additional maximum power reduction A-MPR that is needed. When determining the worst case A-MPR that is needed, the scheduler may assume the minimum resource block (RB) allocation (i.e., 1 RB) for the other RAT when computing the allocation ratio which is then used to determine the needed A-MPR. Since the A-MPR decreases when the allocation ratio increases, this may be a worst case assumption. However, this first A-MPR is the A-MPR that is allowed for the sum power over the two carriers (LTE and NR). In order to determine how much of the remaining power a particular RAT gets, the RAT scheduler may make a second worst case assumption with respect to the size of the RB allocation on the second RAT. The second worst case assumption is that the RB allocation on the second RAT is the maximum possible. Since the fraction of power the first RAT receives is the ratio of the number of RB's on the first RAT to the total number of RB's on both RATs, the fraction of power given to the first RAT is minimized by assuming the largest possible allocation on the second RAT.

It should be noted that these two assumptions result in a worst case estimation that is not feasible and thus cannot happen. It is not possible for the RB allocation on the second RAT to be equal to one and equal to the maximum allowed RB allocation at the same time. As a result, the worst case A-MPR estimation that is calculated in at least some existing systems is in excess of the A-MPR that is actually needed.

As such, it may be beneficial to be able to better address an estimation of the A-MPR needed for contiguous Evolved Universal Terrestrial Radio Access (E-UTRA)-NR Dual Connectivity (EN-DC), in a manner which does not involve the sharing of scheduling information between the two RAT's. In particular, this may be relevant for Band 71 for some system integrators.

The A-MPR for DC_(n)71B is given as described in Section 6.2B.3.1.1 of TS 38.101-3 as below. For the UE not supporting dynamic power sharing, the A-MPR is given by the following:

for UE not indicating support of dynamicPowerSharing $$A\text{-}MPR_{LTE}=\text{CEIL}\{M_{A,LTE},0.5\}$$

$$A\text{-}MPR_{NR}=\text{CEIL}\{M_{A,NR},0.5\}$$

where A-MPR is the total power reduction allowed per CG with $$M_{A,LTE}=M_{A,DC}(A_{LTE,wc})-\Delta_{LTE}$$

$$M_{A,NR}=M_{A,DC}(A_{NR,wc})-\Delta_{NR}$$

$$A_{LTE,wc}=(L_{CRB,LTE}+1)/(N_{RB,LTE}+N_{RB,NR})$$

$$A_{NR,wc}=(1+L_{CRB,NR})/(N_{RB,LTE}+N_{RB,NR})$$

$$\Delta_{LTE}=10\ \log_{10}\{L_{CRB,LTE}/(L_{CRB,LTE}+N_{RB,NR})\}$$

$$\Delta_{NR}=10\ \log_{10}\{L_{CRB,NR}/(N_{RB,LTE}+L_{CRB,NR})\}$$

As defined, the A-MPR for LTE depends on the following two terms $$A_{LTE,wc}=(L_{CRB,LTE}+1)/(N_{RB,LTE}+N_{RB,NR})$$

$$A_{LTE}=^{10}\log_{10}\{L_{CRB,LTE}/(L_{CRB,LTE}+N_{RB,NR})\}$$

The first term $A_{LTE,wc}$ is derived from the allocation ratio $$A=(L_{CRB,LTE}+L_{CRB,NR})/(N_{RB,LTE}+N_{RB,NR})$$

in which $L_{CRB,NR}$ has been set equal to 1. The reason for this substitution is that the A-MPR is monotonically decreasing with the ratio A. So, the worst-case (largest) A-MPR results when the allocation ratio A is minimized by setting $L_{CRB,NR}$ equal to 1.

The second term addresses the fact that the total power is shared between the LTE and NR. Thus, the fraction of the power that should be allocated to LTE is a function of the ratio of the number of LTE RB's to the number of NR RB's. Since the fraction of power allocated to LTE is minimized when this ratio is minimized, the worst-case A-MPR results when the number of NR RB's is set equal to $N_{RB,NR}$, which is the maximum number of RB's for the NR carrier.

The problem with the approach taken in the specification is that it is overly pessimistic in that the worst-case situation used to compute A-MPR is not actually feasible; that is, it is not possible for $L_{CRB,NR}$ to be equal to both 1 and $N_{RB,NR}$, simultaneously. In fact, the worst-case A-MPR that is achievable results when $L_{CRB,NR}$ is chosen so as to maximize.

$$M_{A,LTE} = \max_{L_{CRB,NR} \leq N_{RB,NR}} \left\{ M_{A,DC}\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right) \right\}$$

According to a possible embodiment, in looking at the A-MPR specified for dynamic power sharing, it can be seen that there are three cases to consider for both orthogonal frequency division multiplexing (OFDM) and discrete Fourier transform spread orthogonal frequency division multiplexing (DFT-S-OFDM).

For OFDM, the A-MPR for an allocation ratio A in the range $0 < A \leq 0.3$, the worst case non-dynamic power sharing A-MPR is given by $$\max_{L_{CRB,NR} \leq N_{RB,NR}, 0 < A \leq 0.3} \left\{ 10 - 11.67\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right) \right\}$$

Taking the derivative with respect to $L_{CRB,NR}$ and setting equal to 0 yields $$-11.67\left(\frac{1}{N_{RB,LTE} + N_{RB,NR}}\right) + \frac{10}{\ln(10)(L_{CRB,LTE} + L_{CRB,NR})} = 0$$

so that the A-MPR is maximized when $$A = \frac{L_{CRB,LTE} + L_{CRB,NR}}{N_{RB,LTE} + N_{RB,NR}} = \frac{10}{11.67 \cdot \ln(10)} = 0.37$$

Since 0.37 is greater than 0.3, it follows that $$10 - 11.67\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right)$$

is monotonically increasing with $L_{CRB,NR}$ on the interval $0 < A \leq 0.3$. For A in the range $0.3 < A \leq 0.8$, the non-dynamic power sharing A-MPR is given by $$\max_{L_{CRB,NR} \leq N_{RB,NR}, 0.3 < A \leq 0.8} \left\{ 7.1 - 2\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right) \right\}$$

Taking the derivative with respect to $L_{CRB,NR}$ and setting equal to 0 yields $$-2\left(\frac{1}{N_{RB,LTE} + N_{RB,NR}}\right) + \frac{10}{\ln(10)(L_{CRB,LTE} + L_{CRB,NR})} = 0$$

so that the A-MPR is maximized when $$A = \frac{L_{CRB,LTE} + L_{CRB,NR}}{N_{RB,LTE} + N_{RB,NR}} = \frac{10}{2 \cdot \ln(10)} = 2.17$$

Since 2.17 is greater than 0.8, it follows that $$7.1 - 2\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right)$$

is monotonically increasing with $L_{CRB,NR}$ for A on the interval $0.3 < A \leq 0.8$. Finally, for A in the range $0.8 < A \leq 1$, the non-dynamic power sharing A-MPR is given by $$\max_{L_{CRB,NR} \leq N_{RB,NR}, 0.8 < A \leq 1} \left\{ 5.5 - 10\log_{10}\left(\frac{L_{CRB,LTE}}{L_{CRB,LTE} + L_{CRB,NR}}\right) \right\}$$

which is clearly monotonically increasing with $L_{CRB,NR}$ for A on the interval $0.8 < A \leq 1$ since only the second term depends on $L_{CRB,NR}$.

From the analysis of the three regions given above, it follows that for OFDM $$\max_{L_{CRB,NR} \leq N_{RB,NR}} \left\{ M_{A,DC}\left(\frac{L_{CRB,LTE} + L_{CRB,NR}}{N_{RB,LTE} + N_{RB,NR}}\right) - 10\log_{10}\left(\frac{L_{CRB,LTE}}{L_{CRB,LTE} + L_{CRB,NR}}\right) \right\}$$

increases monotonically with $L_{CRB,NR}$ for A in the interval $0 < A \leq 1$. Thus, the worst case A-MPR results when $$L_{CRB,NR} = N_{RB,NR}$$

so that the worst-case A-MPR is given by $$M_{A,DC}\left(\frac{L_{CRB,LTE} + N_{RB,NR}}{N_{RB,LTE} + N_{RB,NR}}\right) - 10\log_{10}\left(\frac{L_{CRB,LTE}}{L_{CRB,LTE} + N_{RB,NR}}\right)$$

which is significantly less than the value currently in the specification which is given by $$M_{A,DC}\left(\frac{L_{CRB,LTE} + 1}{N_{RB,LTE} + N_{RB,NR}}\right) - 10\log_{10}\left(\frac{L_{CRB,LTE}}{L_{CRB,LTE} + N_{RB,NR}}\right)$$

Figure 2:
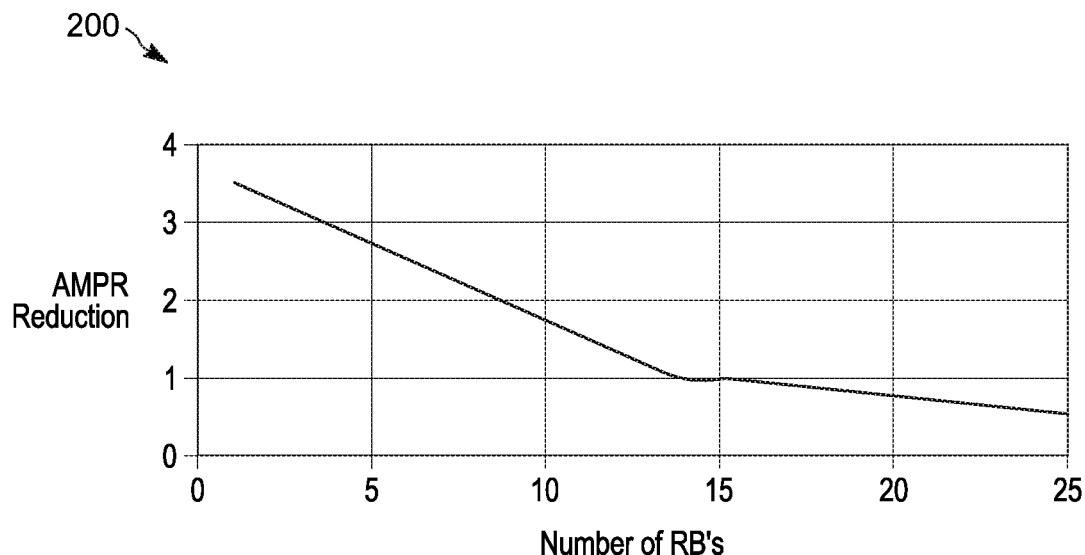
FIG. 2 is an exemplary graph of additional maximum power reduction (A-MPR) vs. number of resource blocks (RB's) for orthogonal frequency division multiplexing (OFDM)

FIG. 2 illustrates an exemplary graph 200 of additional maximum power reduction (A-MPR) vs. number of resource blocks (RB's) for orthogonal frequency division multiplexing (OFDM). In FIG.2, we plot the difference between the value currently in the specification and the newly proposed A-MPR as a function of the allocation ratio for $N_{RB,LTE} = N_{RB,NR} = 25$.

A similar analysis can be performed for DFT-S-OFDM. For an allocation ratio A in the range $0<A\leq 0.3$, the worst case non-dynamic power sharing A-MPR is given by $$M_{A,LTE} = \max_{L_{CRB,NR}\leq N_{RB,NR},0<A\leq 0.3} \left\{10 - 13.33\left(\frac{L_{CRB,LTE}+L_{CRB,NR}}{N_{RB,LTE}+N_{RB,NR}}\right) - 10\log_{10}\left(\frac{L_{CRB,LTE}}{L_{CRB,LTE}+L_{CRB,NR}}\right)\right\}$$

Taking the derivative with respect to $L_{CRB,NR}$ and setting equal to 0 yields $$-13.33\left(\frac{1}{N_{RB,LTE}+N_{RB,NR}}\right) + \frac{10}{\ln(10)(L_{CRB,LTE}+L_{CRB,NR})} = 0$$

so that the A-MPR is maximized when $$A = \frac{L_{CRB,LTE}+L_{CRB,NR}}{N_{RB,LTE}+N_{RB,NR}} = \frac{10}{13.33\cdot\ln(10)} = 0.33$$

Since 0.33 is greater than 0.3, if follows that $$10 - 13.33\left(\frac{L_{CRB,LTE}+L_{CRB,NR}}{N_{RB,LTE}+N_{RB,NR}}\right) - 10\log_{10}\left(\frac{L_{CRB,LTE}}{L_{CRB,LTE}+L_{CRB,NR}}\right)$$

is monotonically increasing with $L_{CRB,NR}$ for A the interval $0<A\leq 0.3$. For A in the range $0.3<A\leq 0.6$, the non-dynamic power sharing A-MPR is given by $$\max_{L_{CRB,NR}\leq N_{RB,NR},0.3<A\leq 0.6} \left\{7 - 3.33\left(\frac{L_{CRB,LTE}+L_{CRB,NR}}{N_{RB,LTE}+N_{RB,NR}}\right) - 10\log_{10}\left(\frac{L_{CRB,LTE}}{L_{CRB,LTE}+L_{CRB,NR}}\right)\right\}$$

Taking the derivative with respect to $L_{CRB,NR}$ and setting equal to 0 yields $$-3.33\left(\frac{1}{N_{RB,LTE}+N_{RB,NR}}\right) + \frac{10}{\ln(10)(L_{CRB,LTE}+L_{CRB,NR})} = 0$$

so that the A-MPR is maximized when $$A = \frac{L_{CRB,LTE}+L_{CRB,NR}}{N_{RB,LTE}+N_{RB,NR}} = \frac{10}{3.33\cdot\ln(10)} = 1.30$$

Since 1.30 is greater than 0.6, it follows that $$7 - 2\left(\frac{L_{CRB,LTE}+L_{CRB,NR}}{N_{RB,LTE}+N_{RB,NR}}\right) - 10\log_{10}\left(\frac{L_{CRB,LTE}}{L_{CRB,LTE}+L_{CRB,NR}}\right)$$

is monotonically increasing with $L_{CRB,NR}$ for A on the interval $0.3<A\leq 0.6$. Finally, for A in the range $0.6<A\leq 1$, the non-dynamic power sharing A-MPR is given by $$\max_{L_{CRB,NR}\leq N_{RB,NR},0.6<A\leq 1} \left\{5 - 10\log_{10}\left(\frac{L_{CRB,LTE}}{L_{CRB,LTE}+L_{CRE,NR}}\right)\right\}$$

which is clearly monotonically increasing with $L_{CRB,NR}$ for A on the interval $0.6<A\leq 1$ since only the second term depends on $L_{CRB,NR}$. From the analysis of the three regions given above, it follows that for DFT-S-OFDM $$\max_{L_{CRB,NR}\leq N_{RB,NR}} \left\{M_{A,DC}\left(\frac{L_{CRB,LTE}+L_{CRB,NR}}{N_{RB,LTE}+N_{RB,NR}}\right) - 10\log_{10}\left(\frac{L_{CRB,LTE}}{L_{CRB,LTE}+L_{CRB,NR}}\right)\right\}$$

is monotonically increasing for A in the interval $0<A\leq 1$. Thus, the worst case A-MPR results when $$L_{CRB,NR}=N_{RB,NR}$$

so that the worst-case A-MPR is given by $$M_{A,DC}\left(\frac{L_{CRB,LTE}+N_{RB,NR}}{N_{RB,LTE}+N_{RB,NR}}\right) - 10\log_{10}\left(\frac{L_{CRB,LTE}}{L_{CRB,LTE}+N_{RB,NR}}\right)$$

Figure 3:
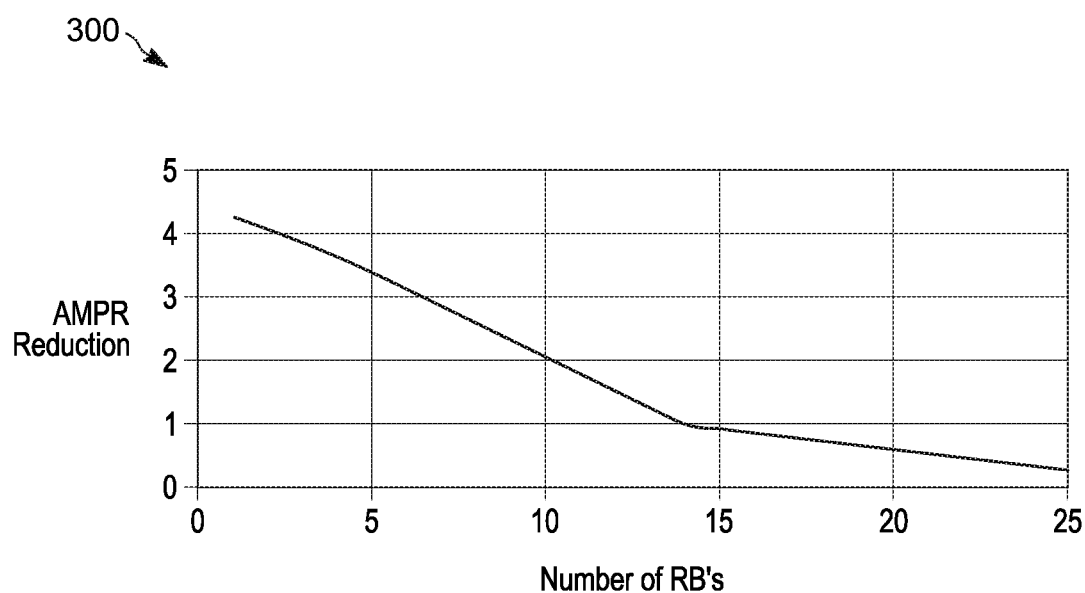
FIG. 3 is an exemplary graph of A-MPR reduction vs. number of RB's for discrete Fourier transform spread orthogonal frequency division multiplexing (DFT-S-OFDM)

FIG. 3 illustrates an exemplary graph 300 of A-MPR reduction vs. number of RB's for discrete Fourier transform spread orthogonal frequency division multiplexing (DFT-S-OFDM). In FIG. 3, we plot the difference between the value currently in the specification and the newly proposed A-MPR as a function of the allocation ratio for $N_{RB,LTE}=N_{RB,NR}=25$ and several different values of $L_{CRB,LTE}$.

From FIG. 3, it can be seen that the worst case A-MPR can be significantly reduced by maximizing the A-MPR over worst case allocations which are actually feasible.

As a result of the above analysis, an alternative approach for determining a less restrictive worst case A-MPR may be feasible. In accordance with at least one embodiment of the present application, an alternative approach to determining A-MPR is provided, as follows.

The A-MPR is to be defined as $$M_{A,LTE} = M_{A,DC}\left(\frac{L_{CRB,LTE}+N_{RB,NR}}{N_{RB,LTE}+N_{RB,NR}}\right) - 10\log_{10}\left(\frac{L_{CRB,LTE}}{L_{CRB,LTE}+N_{RB,NR}}\right),$$

and similarly, $$M_{A,NR} = M_{A,DC}\left(\frac{L_{CRB,NR}+N_{RB,LTE}}{N_{RB,LTE}+N_{RB,NR}}\right) - 10\log_{10}\left(\frac{L_{CRB,NR}}{L_{CRB,NR}+N_{RB,LTE}}\right).$$

Note that the total power that can be transmitted without dynamic power sharing with the proposed change is still less than the power that can be transmitted with dynamic power sharing. The maximum transmit power without dynamic power sharing is given by $$P_{EN\text{-}DC}=10\log_{10}(10^{-M_{A,LTE}}+10^{-M_{A,DC}})$$

Above, we have shown that $$M_{A,LTE} = M_{A,DC}\left(\frac{L_{CRB,LTE} + N_{RB,NR}}{N_{RB,LTE} + N_{RB,NR}}\right) - 10\log_{10}\left(\frac{L_{CRB,LTE}}{L_{CRB,LTE} + N_{RB,NR}}\right) \geq$$

$$M_{A,DC}\left(\frac{L_{CRB,LTE} + L_{RB,NR}}{N_{RB,LTE} + N_{RB,NR}}\right) - 10\log_{10}\left(\frac{L_{CRB,LTE}}{L_{CRB,LTE} + L_{CRB,NR}}\right)$$

therefore, it follows that $$P_{EN-DC} - 10\log_{10}(10^{-M_{A,LTE}} + 10^{-M_{A,DC}}) \leq P_{EN-DC} -$$

$$10\log_{10}\left(10^{-\left(M_{A,DC}\left(\frac{L_{CRB,LTE}+L_{RB,NR}}{N_{RB,LTE}+N_{RB,NR}}\right) - 10\log_{10}\left(\frac{L_{CRB,LTE}}{L_{CRB,LTE}+L_{CRB,NR}}\right)\right)} +$$

$$10^{-\left(M_{A,DC}\left(\frac{L_{CRB,LTE}+L_{RB,NR}}{N_{RB,LTE}+N_{RB,NR}}\right) - 10\log_{10}\left(\frac{L_{CRB,NR}}{L_{CRB,LTE}+L_{CRB,NR}}\right)\right)}\right) =$$

$$P_{EN-DC} - 10\log_{10}\left(10^{-\left(M_{A,DC}\left(\frac{L_{CRB,LTE}+L_{RB,NR}}{N_{RB,LTE}+N_{RB,NR}}\right)\right)}\right.$$

$$\left.\left(\frac{L_{CRB,LTE}}{L_{CRB,LTE}+L_{CRB,NR}} + \frac{L_{CRB,NR}}{L_{CRB,LTE}+L_{CRB,NR}}\right)\right) =$$

$$P_{EN-DC} - M_{A,DC}\left(\frac{L_{CRB,LTE}+L_{RB,NR}}{N_{RB,LTE}+N_{RB,NR}}\right)$$

so that the maximum transmit power without dynamic power sharing and with the proposed change is still less than the maximum transmit power with dynamic power sharing.

Additional Observations

In developing the A-MPR values in 6.2B.3.1.1, it was assumed that the power spectral density of the two carriers is equal. Thus, in the simulations used to generate these A-MPR values, the power spectral density of the LTE carrier and the NR carrier was set to be equal. However, because there are independent power control loops for the two carriers, there is no way to ensure that power spectral density of the two carriers is the same even in the case that the LTE and NR base stations are co-sited. For this reason, in order for the A-MPR in 6.2B.3.1.1 to be valid even when the power spectral densities of the two carriers is not equal, it may be the case that equal power spectral density for the LTE and NR carriers is the worst case in terms of the A-MPR needed to meet emissions requirements.

It can be noted that with the approach taken here, the maximum power spectral density (PSD) of each carrier in the absence of dynamic power sharing will be less than or equal to the maximum power spectral density that is allowed with dynamic power spectral sharing. This can be shown as in the following. With dynamic power sharing, the maximum PSD of the LTE carrier (in dBm per RB) is given by $$P_{EN-DC} - \left(M_{A,DC}\left(\frac{L_{CRB,LTE}+L_{CRB,NR}}{N_{RB,LTE}+N_{RB,NR}}\right) - 10\log_{10}\left(\frac{L_{CRB,LTE}}{L_{CRB,LTE}+L_{CRB,NR}}\right)\right) -$$

$$10\log_{10}(L_{CRB,LTE}) =$$

$$P_{EN-DC} - M_{A,DC}\left(\frac{L_{CRB,LTE}+L_{CRB,NR}}{N_{RB,LTE}+N_{RB,NR}}\right) + 10\log_{10}\left(\frac{1}{L_{CRB,LTE}+N_{RB,NR}}\right)$$

which is the same as the maximum PSD for the NR carrier.

We next consider the maximum PSD without dynamic power sharing with the A-MPR formulation proposed above. For the LTE carrier, the maximum PSD is given by $$P_{EN-DC} - \left(M_{A,DC}\left(\frac{L_{CRB,LTE}+N_{RB,NR}}{N_{RB,LTE}+N_{RB,NR}}\right) - 10\log_{10}\left(\frac{L_{CRB,LTE}}{L_{CRB,LTE}+L_{CRB,NR}}\right)\right) -$$

$$10\log_{10}(L_{CRB,LTE}) =$$

$$P_{EN-DC} - M_{A,DC}\left(\frac{L_{CRB,LTE}+N_{RB,NR}}{N_{RB,LTE}+N_{RB,NR}}\right) + 10\log_{10}\left(\frac{1}{L_{CRB,LTE}+N_{RB,NR}}\right).$$

If we subtract the maximum PSD without dynamic power sharing from the maximum PSD with dynamic power sharing for the LTE carrier, we get the expression $$M_{A,DC}\left(\frac{L_{CRB,LTE}+N_{RB,NR}}{N_{RB,LTE}+N_{RB,NR}}\right) - 10\log_{10}\left(\frac{L_{CRB,LTE}}{L_{CRB,LTE}+N_{RB,NR}}\right) -$$

$$\left(M_{A,DC}\left(\frac{L_{CRB,LTE}+L_{CRB,NR}}{N_{RB,LTE}+N_{RB,NR}}\right) - 10\log_{10}\left(\frac{L_{CRB,LTE}}{L_{CRB,LTE}+L_{CRB,NR}}\right)\right)$$

Figure 4:
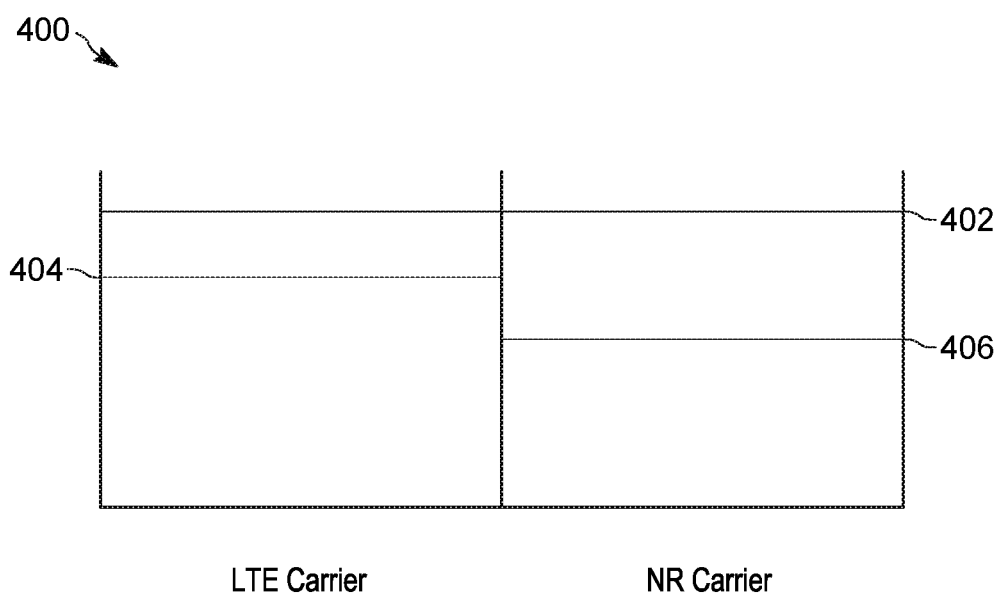
FIG. 4 is an exemplary graph of maximum power spectral density with and without dynamic power sharing, where with proposed A-MPR, maximum power spectral density (PSD) is reduced in the absence of dynamic power sharing.

Now because we have previously shown that the following expression is monotonically increasing with $L_{CRB,LTE}$ for A in the interval $0 < A \leq 1$.

$$M_{A,DC}\left(\frac{L_{CRB,LTE}+L_{CRB,NR}}{N_{RB,LTE}+N_{RB,NR}}\right) - 10\log_{10}\left(\frac{L_{CRB,LTE}}{L_{CRB,LTE}+L_{CRB,NR}}\right),$$

it follows that $$M_{A,DC}\left(\frac{L_{CRB,LTE}+N_{RB,NR}}{N_{RB,LTE}+N_{RB,NR}}\right) - 10\log_{10}\left(\frac{L_{CRB,LTE}}{L_{CRB,LTE}+N_{RB,NR}}\right) \geq$$

$$M_{A,DC}\left(\frac{L_{CRB,LTE}+L_{CRB,NR}}{N_{RB,LTE}+N_{RB,NR}}\right) - 10\log_{10}\left(\frac{L_{CRB,LTE}}{L_{CRB,LTE}+L_{CRB,NR}}\right)$$

and thus the PSD for the LTE carrier without dynamic power sharing is less than or equal to the PSD with dynamic power sharing with the proposed A-MPR. In the same or similar manner, it can be shown that the PSD for the NR carrier without dynamic power sharing is less than or equal to the PSD with dynamic power sharing with the proposed A-MPR. The situation is illustrated in FIG. 4, where FIG. 4 illustrates an exemplary graph 400 of maximum power spectral density with and without dynamic power sharing, where with proposed A-MPR, maximum PSD is reduced in the absence of dynamic power sharing.

Level 402 represents an exemplary maximum PSD with dynamic power sharing, which depends on both $L_{CRB,NR}$ and $L_{CRB,LTE}$. Level 404 represents an exemplary maximum PSD without dynamic power sharing, which depends only on $L_{CRB,LTE}$. Level 406 represents an exemplary maximum PSD without dynamic power sharing, which depends only on $L_{CRB,NR}$.

Figure 5:
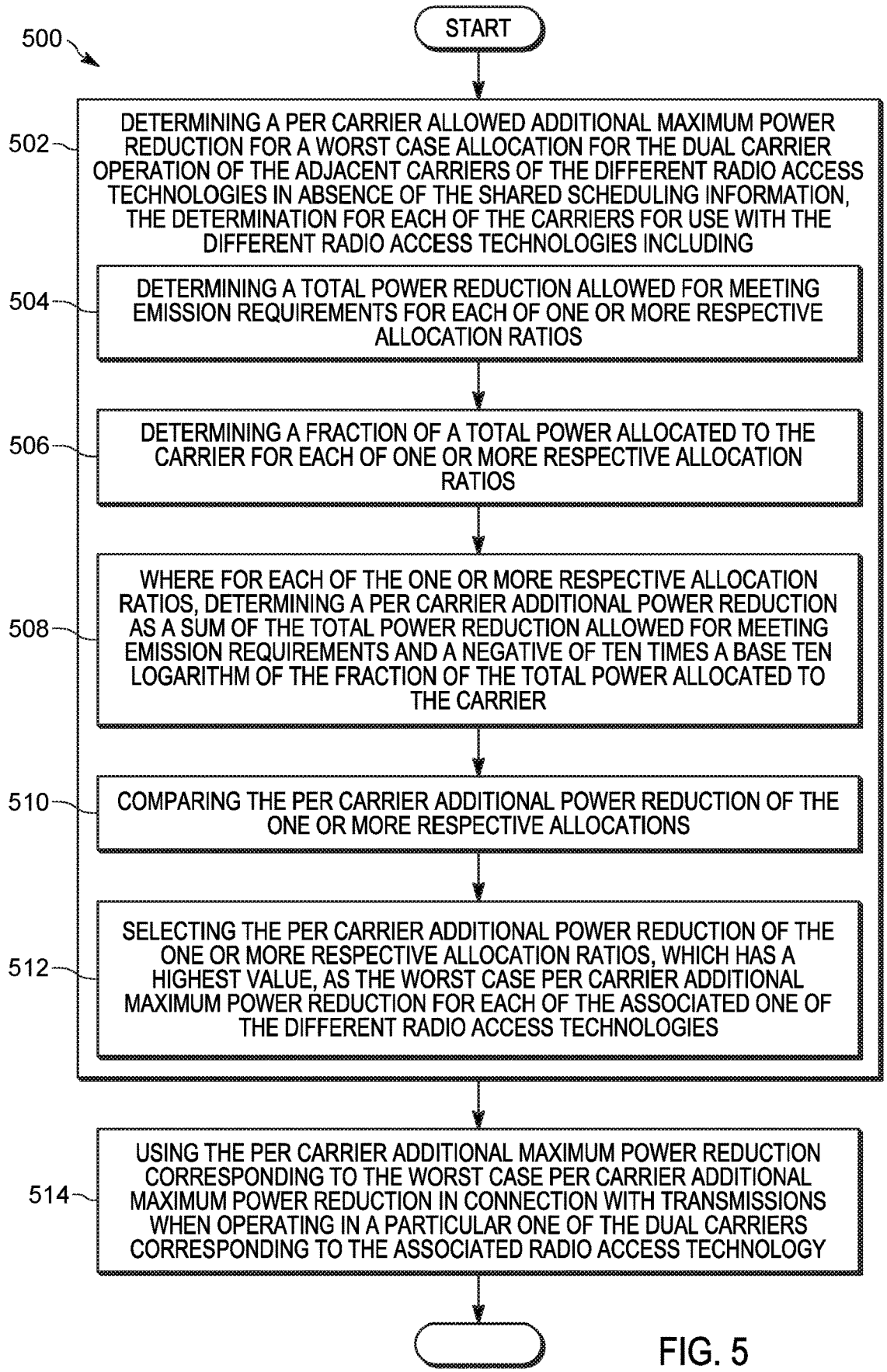
FIG. 5 is a flow diagram in a user equipment for determining a per carrier additional maximum power reduction needed by the user equipment in order to meet emission requirements for dual carrier operation of adjacent carriers in absence of shared scheduling information between the adjacent carriers.

FIG. 5 is a flow diagram 500 in a user equipment for determining a per carrier additional maximum power reduction needed by the user equipment in order to meet emission requirements for dual carrier operation of adjacent carriers in absence of shared scheduling information between the adjacent carriers, each carrier having an associated respective one of multiple different radio access technologies. The method includes determining 502 a per carrier allowed additional maximum power reduction for a worst case allocation for the dual carrier operation of the adjacent carriers of the different radio access technologies in absence of the shared scheduling information. The determination for each of the carriers for use with the different radio access technologies includes determining 504 a total power reduction allowed for meeting emission requirements for each of one or more respective allocation ratios, and determining 506 a fraction of a total power allocated to the carrier for each of one or more respective allocation ratios. For each of the one or more respective allocation ratios, a per carrier additional power reduction is determined 508 as a sum of the total power reduction allowed for meeting emission requirements and a negative of ten times a base ten logarithm of the fraction of the total power allocated to the carrier. The per carrier additional power reduction of the one or more respective allocations are compared 510, and the per carrier additional power reduction of the one or more respective allocation ratios, which has a highest value, is selected 512 as the worst case per carrier additional maximum power reduction for each of the associated one of the different radio access technologies. The method further includes using 514 the per carrier additional maximum power reduction corresponding to the worst case per carrier additional maximum power reduction in connection with transmissions when operating in a particular one of the dual carriers corresponding to the associated radio access technology.

In some instances, a combined worst case allocation ratio for each carrier determines the fraction of the total power allocated to each carrier for transmission power sharing between adjacent carriers using different radio access technologies.

In some instances, one of the multiple different radio access technologies includes a radio access technology implementing orthogonal frequency division multiplexing. In some of these instances, the radio access technology implementing orthogonal frequency division multiplexing includes a radio access technology implementing fourth generation Long Term Evolution (LTE).

In some instances, one of the multiple different radio access technologies includes a radio access technology implementing discrete Fourier transform spread orthogonal frequency division multiplexing. In some of these instances, the radio access technology implementing discrete Fourier transform spread orthogonal frequency division multiplexing includes a radio access technology implementing fifth generation New Radio (NR).

In some instances, the per carrier allowed additional maximum power reduction for the carrier associated with the fourth generation Long Term Evolution is determined by equation $$M_{A,LTE} = M_{A,DC}\left(\frac{L_{CRB,LTE} + N_{RB,NR}}{N_{RB,LTE} + N_{RB,NR}}\right) - 10\log_{10}\left(\frac{L_{CRB,LTE}}{L_{CRB,LTE} + N_{RB,NR}}\right).$$

In some instances, the per carrier allowed additional maximum power reduction for the carrier associated with the fifth generation New Radio is determined by equation $$M_{A,NR} = M_{A,DC}\left(\frac{L_{CRB,NR} + N_{RB,LTE}}{N_{RB,LTE} + N_{RB,NR}}\right) - 10\log_{10}\left(\frac{L_{CRB,NR}}{L_{CRB,NR} + N_{RB,LTE}}\right).$$

In some instances, the per carrier additional maximum power reduction is used in a user equipment in connection with an uplink communication with a network base station.

Figure 6:
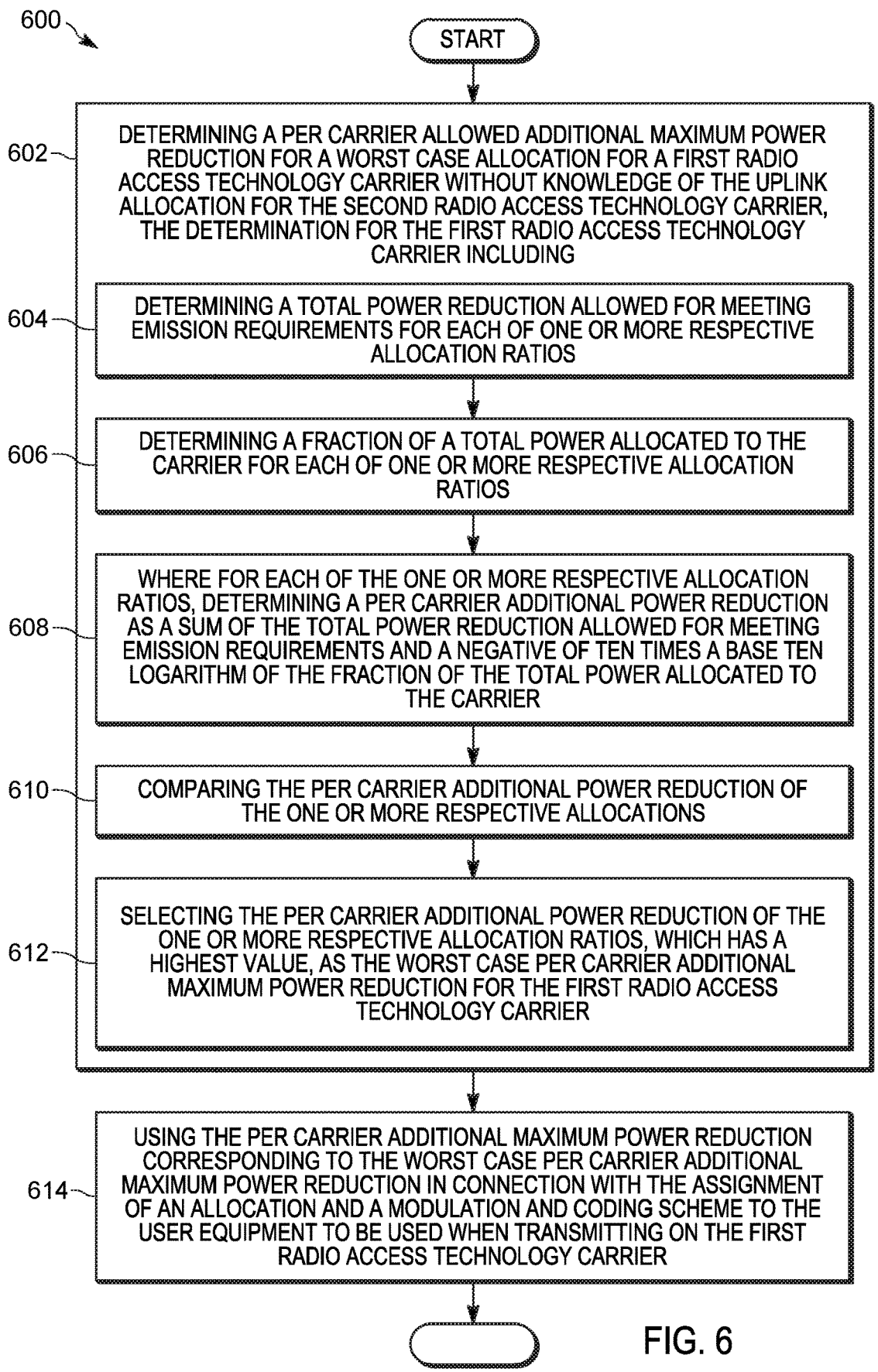
FIG. 6 is a flow diagram in a network entity for a first radio access technology in a communication network for determining a per carrier additional maximum power reduction for a first radio access technology carrier of a dual carrier operation user equipment, where the dual carriers are adjacent uplink carriers corresponding to different radio access technologies, and where the network entity does not have knowledge of the uplink allocation for a second radio access technology carrier associated with the dual carrier operation.

FIG. 6 is a flow diagram 600 in a network entity for a first radio access technology in a communication network for determining a per carrier additional maximum power reduction for a first radio access technology carrier of a dual carrier operation user equipment, where the dual carriers are adjacent uplink carriers corresponding to different radio access technologies, and where the network entity does not have knowledge of the uplink allocation for a second radio access technology carrier associated with the dual carrier operation, which is different from the first radio access technology carrier. The method includes determining 602 a per carrier allowed additional maximum power reduction for a worst case allocation for a first radio access technology carrier without knowledge of the uplink allocation for the second radio access technology carrier. The determination for the first radio access technology carrier includes determining 604 a total power reduction allowed for meeting emission requirements for each of one or more respective allocation ratios, and determining 606 a fraction of a total power allocated to the carrier for each of one or more respective allocation ratios. For each of the one or more respective allocation ratios, a per carrier additional power reduction is determined 608 as a sum of the total power reduction allowed for meeting emission requirements and a negative of ten times a base ten logarithm of the fraction of the total power allocated to the carrier. The per carrier additional power reduction of the one or more respective allocations is compared 610, and the per carrier additional power reduction of the one or more respective allocation ratios, which has a highest value, is selected 612 as the worst case per carrier additional maximum power reduction for the first radio access technology carrier. The method further includes using 614 the per carrier additional maximum power reduction corresponding to the worst case per carrier additional maximum power reduction in connection with the assignment of an allocation and a modulation and coding scheme to the user equipment to be used when transmitting on the first radio access technology carrier.

Figure 7:
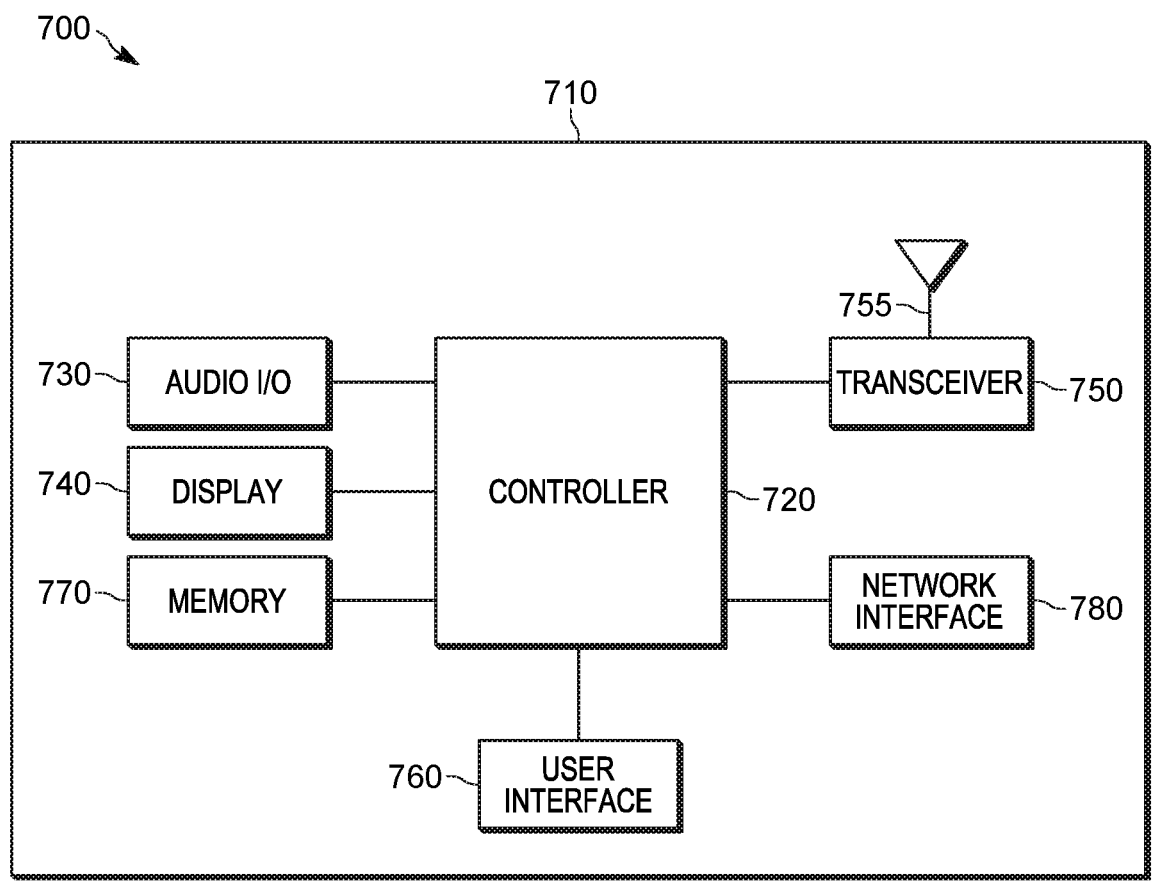
FIG. 7 is an example block diagram of an apparatus according to a possible embodiment.

FIG. 7 is an example block diagram of an apparatus 700, such as the wireless communication device 110, according to a possible embodiment. The apparatus 700 can include a housing 710, a controller 720 within the housing 710, audio input and output circuitry 730 coupled to the controller 720, a display 740 coupled to the controller 720, a transceiver 750 coupled to the controller 720, an antenna 755 coupled to the transceiver 750, a user interface 760 coupled to the controller 720, a memory 770 coupled to the controller 720, and a network interface 780 coupled to the controller 720. The apparatus 700 can perform the methods described in all the embodiments.

The display 740 can be a viewfinder, a liquid crystal display (LCD), a light emitting diode (LED) display, a plasma display, a projection display, a touch screen, or any other device that displays information. The transceiver 750 can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 770 can include a random access memory, a read only memory, an optical memory, a solid state memory, a flash memory, a removable memory, a hard drive, a cache, or any other memory that can be coupled to an apparatus.

The apparatus 700 or the controller 720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 770 or elsewhere on the apparatus 700. The apparatus 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an apparatus and implementing the disclosed embodiments. Some or all of the additional elements of the apparatus 700 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first", "second", and the like may be used solely to distinguish one entity or action from another entity or action without necessarily requiring or implying any actual such relationship or order between such entities or actions. The phrase "at least one of", "at least one selected from the group of", or "at least one selected from" followed by a list is defined to mean one, some, or all, but not necessarily all of, the elements in the list. The terms "comprises", "comprising", "including", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that comprises the element. Also, the term "another" is defined as at least a second or more. The terms "including", "having", and the like, as used herein, are defined as "comprising". Furthermore, the background section is written as the inventor's own understanding of the context of some embodiments at the time of filing and includes the inventor's own recognition of any problems with existing technologies and/or problems experienced in the inventor's own work.

APPENDIX

From TS 36.801-3
6.2B.3.1.1 A-MPR for DC_(n)71B
For DC_(n)71B with configured with network signaling values as per Table 6.2B.3.1.1-1 the allowed A-MPR is defined by
for UE indicating support of dynamicPowerSharing in the UE-MRDC-Capability IE $A\text{-}MPR_{DC}=\text{CEIL}\{M_{A,DC}(A),0.5\}$ where A-MPR$_{DC}$ is the total power reduction allowed (dB),
for OFDM:
$M_{A,DC}=10.00-11.67*A; \ 0.00<A\le 0.30$
$7.10-2.00*A; \ 0.30<A\le 0.80$
$5.50; \ 0.80<A\le 1.00$
for DFT-S-OFDM:
$M_{A,DC}=10.00-13.33*A; \ 0.00<A\le 0.30$
$7.00-3.33*A; \ 0.30<A\le 0.60$
$5.00; \ 0.60<A\le 1.00$
where $A=(L_{CRB,LTE}+L_{CRB,NR})/(N_{RB,LTE}+N_{RB,NR})$ with $L_{CRB}$ and $N_{RB}$ the number of allocated PRB and transmission bandwidth for the respective CG,
for UE not indicating support of dynamicPowerSharing $A\text{-}MPR_{LTE}=\text{CEIL}\{M_{A,LTE},0.5\}$ $A\text{-}MPR_{NR}=\text{CEIL}\{M_{A,NR},0.5\}$ where A-MPR is the total power reduction allowed per CG with $M_{A,LTE}=M_{A,DC}(A_{LTE,wc})-\Delta_{LTE}$ $M_{A,NR}=M_{A,DC}(A_{NR,wc})-\Delta_{NR}$ $A_{LTE,wc}=(L_{CRB,LTE}+1)/(N_{RB,LTE}+N_{RB,NR})$ $A_{NR,wc}=(1+L_{CRB,NR})/(N_{RB,LTE}+N_{RB,NR})$ $\Delta_{LTE}=10\ \log_{10}\{L_{CRB,LTE}/(L_{CRB,LTE}+N_{RB,NR})\}$ $\Delta_{NR}=10\ \log_{10}\{L_{CRB,NR}/(N_{RB,LTE}+L_{CRB,NR})\}$ where $\tilde{N}_{RB,NR}$ is the transmission bandwidth configuration of the SCG channel for SCS=15 kHz.

What is claimed is:
1. A method in a user equipment for determining a per carrier additional maximum power reduction needed by the user equipment in order to meet emission requirements for dual carrier operation of adjacent carriers in absence of shared scheduling information between the adjacent carriers, each carrier having an associated respective one of multiple different radio access technologies, the method comprising:

determining a per carrier allowed additional maximum power reduction for a worst case allocation for the dual carrier operation of the adjacent carriers of the different radio access technologies in absence of the shared scheduling information, the determination for each of the carriers for use with the different radio access technologies including determining a total power reduction allowed for meeting emission requirements for each of one or more respective allocation ratios, determining a fraction of a total power allocated to the carrier for each of one or more respective allocation ratios, where for each of the one or more respective allocation ratios, determining a per carrier additional power reduction as a sum of the total power reduction allowed for meeting emission requirements and a negative of ten times a base ten logarithm of the fraction of the total power allocated to the carrier, comparing the per carrier additional power reduction of the one or more respective allocations, and selecting the per carrier additional power reduction of the one or more respective allocation ratios, which has a highest value, as the worst case per carrier additional maximum power reduction for each of the associated one of the different radio access technologies; and using the per carrier additional maximum power reduction corresponding to the worst case per carrier additional maximum power reduction in connection with transmissions when operating in a particular one of the dual carriers corresponding to the associated radio access technology.

2. A method in accordance with claim 1, wherein a combined worst case allocation ratio for each carrier determines the fraction of the total power allocated to each carrier for transmission power sharing between adjacent carriers using different radio access technologies.

3. A method in accordance with claim 1, wherein one of the multiple different radio access technologies includes a radio access technology implementing orthogonal frequency division multiplexing.

4. A method in accordance with claim 3, wherein the radio access technology implementing orthogonal frequency division multiplexing includes a radio access technology implementing fourth generation Long Term Evolution (LTE).

5. A method in accordance with claim 4, wherein one of the multiple different radio access technologies includes a radio access technology implementing discrete Fourier transform spread orthogonal frequency division multiplexing.

6. A method in accordance with claim 5, wherein the radio access technology implementing discrete Fourier transform spread orthogonal frequency division multiplexing includes a radio access technology implementing fifth generation New Radio (NR).

7. A method in accordance with claim 6, wherein the per carrier allowed additional maximum power reduction for the carrier associated with the fourth generation Long Term Evolution is determined by equation $$M_{A,LTE} = M_{A,DC}\left(\frac{L_{CRB,LTE} + N_{RB,NR}}{N_{RB,LTE} + N_{RB,NR}}\right) - 10\log_{10}\left(\frac{L_{CRB,LTE}}{L_{CRB,LTE} + N_{RB,NR}}\right).$$

8. A method in accordance with claim 6, wherein the per carrier allowed additional maximum power reduction for the carrier associated with the fifth generation New Radio is determined by equation $$M_{A,NR} = M_{A,DC}\left(\frac{L_{CRB,NR} + N_{RB,LTE}}{N_{RB,LTE} + N_{RB,NR}}\right) - 10\log_{10}\left(\frac{L_{CRB,NR}}{L_{CRB,NR} + N_{RB,LTE}}\right).$$

9. A method in accordance with claim 1, wherein the per carrier additional maximum power reduction is used in a user equipment in connection with an uplink communication with a network base station.

10. A user equipment in a communication network, the user equipment comprising:

a controller that determines a per carrier allowed additional maximum power reduction for a worst case allocation for the dual carrier operation of adjacent carriers of different radio access technologies in absence of shared scheduling information between the adjacent carriers, the determination for each of the carriers for use with the different radio access technologies including determining a total power reduction allowed for meeting emission requirements for each of one or more respective allocation ratios, determining a fraction of a total power allocated to the carrier for each of one or more respective allocation ratios, where for each of the one or more respective allocation ratios, determining a per carrier additional power reduction as a sum of the total power reduction allowed for meeting emission requirements and a negative of ten times a base ten logarithm of the fraction of the total power allocated to the carrier, comparing the per carrier additional power reduction of the one or more respective allocations, and selecting the per carrier additional power reduction of the one or more respective allocation ratios, which has a highest value, as the worst case per carrier additional maximum power reduction for each of the associated one of the different radio access technologies; and a transceiver that uses the per carrier additional maximum power reduction corresponding to the worst case per carrier additional maximum power reduction in connection with transmissions when operating in a particular one of the dual carriers corresponding to the associated radio access technology.

11. A user equipment in accordance with claim 10, wherein one of the multiple different radio access technologies includes a radio access technology implementing orthogonal frequency division multiplexing.

12. A user equipment in accordance with claim 11, wherein the radio access technology implementing orthogonal frequency division multiplexing includes a radio access technology implementing fourth generation Long Term Evolution (LTE).

13. A user equipment in accordance with claim 12, wherein one of the multiple different radio access technologies includes a radio access technology implementing discrete Fourier transform spread orthogonal frequency division multiplexing.

14. A user equipment in accordance with claim 13, wherein the radio access technology implementing discrete Fourier transform spread orthogonal frequency division multiplexing includes a radio access technology implementing fifth generation New Radio (NR).

15. A user equipment in accordance with claim 14, wherein the per carrier allowed additional maximum power reduction for the carrier associated with the fourth generation Long Term Evolution is determined by equation $$M_{A,LTE} = M_{A,DC}\left(\frac{L_{CRB,LTE} + N_{RB,NR}}{N_{RB,LTE} + N_{RB,NR}}\right) - 10\log_{10}\left(\frac{L_{CRB,LTE}}{L_{CRB,LTE} + N_{RB,NR}}\right).$$

16. A user equipment in accordance with claim 14, wherein the per carrier allowed additional maximum power reduction for the carrier associated with the fifth generation New Radio is determined by equation $$M_{A,NR} = M_{A,DC}\left(\frac{L_{CRB,NR} + N_{RB,LTE}}{N_{RB,LTE} + N_{RB,NR}}\right) - 10\log_{10}\left(\frac{L_{CRB,NR}}{L_{CRB,NR} + N_{RB,LTE}}\right).$$

17. A user equipment in accordance with claim 12, wherein the per carrier allowed additional maximum power reduction is used by the transceiver in the user equipment in connection with an uplink communication with a network base station.

* * * * *